Aug. 19, 1930.                    W. R. BREWER                    1,773,342
STEERING GEAR
Filed July 13, 1927

Inventor
William R. Brewer
By
Attorney

Patented Aug. 19, 1930

1,773,342

UNITED STATES PATENT OFFICE

WILLIAM R. BREWER, OF DULUTH, MINNESOTA

STEERING GEAR

Application filed July 13, 1927. Serial No. 205,388.

My invention relates to a steering gear for motor vehicles adapted to balance the applied force from the steering wheel shaft of a motor vehicle so that the applied force is directed to either side of the gearing adapted to operate the countershaft carrying the operating arm which is connected with the rod extending to the steering wheels and the connecting member of the steering wheels of a motor vehicle.

A feature of the invention resides in balancing the applied power by means of diametrically oppositely disposed driving pinions which are adapted to be operated by gears directly connected with the operating gears carried by the steering wheel shaft so that when the steering wheel shaft is rotated, power is applied to either side of the differential gearing carried on the countershaft which is adapted to operate the lever which connects with the steering wheels of a vehicle.

It is also a feature of the invention to provide a compact steering gear means for the steering shaft of a motor vehicle wherein the differential gears carried by the countershaft are adapted to have the gears cut away from the working face on the diametrically opposite sides so that the pinion engaging on one side of the differential will engage only one gear, while the pinion engaging on the other side will engage the other gear, thereby permitting the gears carried by the countershaft to be spaced closely together and also permitting the use of a mesh driving pinion which is adapted to mesh with the same yet having a compact nature to the steering gear mechanism.

These features, together with other objects and details of the invention will be more fully and clearly set forth in the specification and claims.

In the drawings forming part of this specification:

Figure 1:
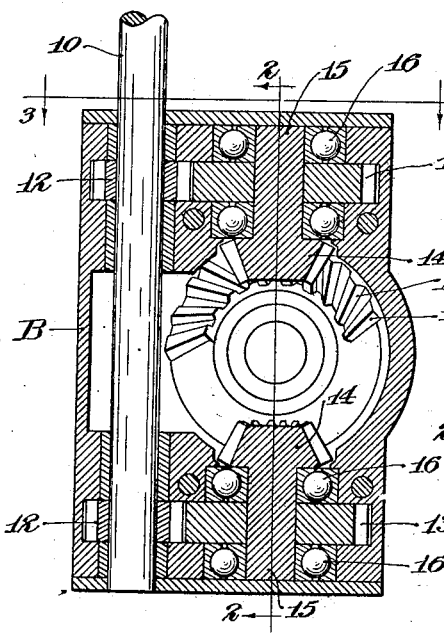
Figure 1 is a sectional side view of my steering gear, a portion being cut away.
Figure 2:
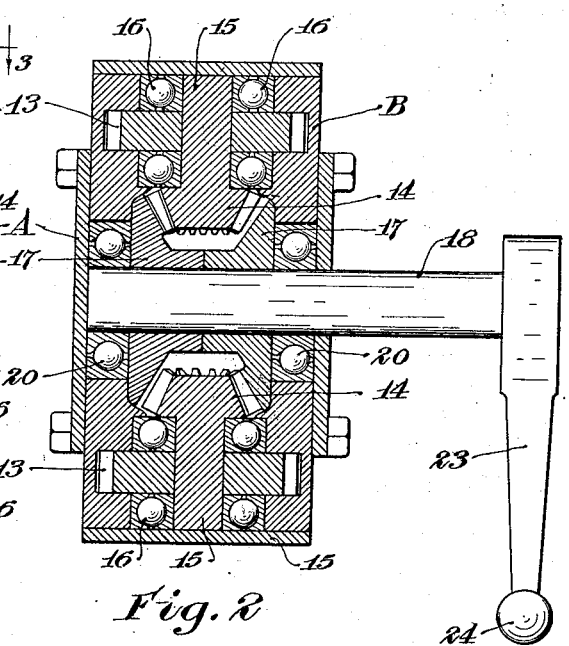
Figure 2 is a section on the line 2—2 of Figure 1.
Figure 3:
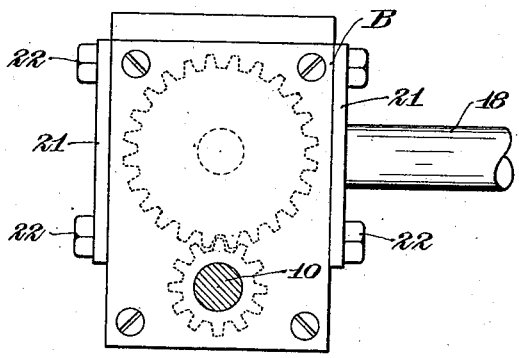
Figure 3 is a plan view on the line 3—3 in the direction of the arrows in Figure 1.
Figure 4:
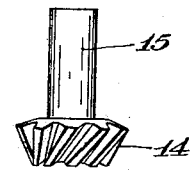
Figure 4 illustrates one of the pinions removed from the casing of the gearing.
Figure 5:
Figure 5 illustrates the two driving gears removed from the steering gear and casing, one of which is carried by the steering wheel shaft and the other by the pinion illustrated in Figure 4.
Figure 6:
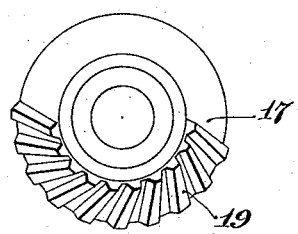
Figure 6 is a face view of one of the differential gears showing the teeth on the same extending only partially about the face thereof.

My steering gear A is adapted to provide a compact steering gear mechanism which is particularly adapted to be used on the steering shaft from the steering wheel of a motor vehicle and I have illustrated only a portion of this shaft 10 which extends down into the casing B of the steering gear A.

The casing B of the steering gear A may be of a comparatively rectangular shape and is adapted to inclose the steering gear mechanism to conceal the same.

The steering shaft 10 extends through the top of the casing B and is adapted to carry driving gears 12 which mesh with the operating gears 13 positioned in the casing B adjacent the steering wheel shaft 10. The gears 12 carried by the steering shaft 10 are approximately half the size of the gears 13, thereby reducing the gear ratio in the operation of the gears 13.

Operating pinions 14 having a shaft portion 15 which is adapted to support the gears 13 and which shafts are mounted in the ball-bearing journals 16 are adapted to provide the operating pinion and gear means for the differential gears 17 which are carried by the countershaft 18 in the steering gear A. The differential gears 17 are adapted to be keyed in a suitable manner to the countershaft 18 and are formed with gear teeth 19 on approximately the semi-circumference of the working face thereof. This permits the gears 17 to be placed closely together with the working faces disposed toward each other and thereby permitting the operating pinions to be positioned between the working faces. The operating pinions engage the gears 17 diametrically opposite so that one pinion 14 engages with one gear 17, while the other pinion 14 engages with the other gear 17. Thus when the steering wheel shaft 10 is rotated the gears 12 will rotate the gears 13 on either side of the countershaft 18 and the pinions 14 will operate the gear 17 on either side thereof and thereby providing a double or balanced application of power to either side of the countershaft 18. The countershaft 18 is adapted to be supported by the ball-bearing journals 20. Suitable face plates 21 which are held by the bolts 22 are adapted to close the sides of the casing B on either side of the differential gearing 17 and the pinions 14.

In operating the steering wheel shaft 10 by the steering wheel which is not shown in the drawings, by applying the power on either side of the differential gearing including the pinions 14 and the gears 17, a double application of power is directed to the diametrically opposite sides of the shaft 18, thereby increasing the power applied to the shaft 18 and balancing the applied power in a manner so as to easily rotate the shaft 18 to operate the steering lever arm 23 which is connected in the ordinary well known manner by the free end 24 thereby to the steering wheels of an automobile or motor vehicle to move the wheels in steering.

My steering gear A thus provides a very simple inexpensive structure having a balanced applied power to the counter-shaft 18 which permits the same to be very easily operated in a manner so as to provide a steering gear which may be operated by the finger tips, so as to speak, to steer the wheels of a motor vehicle in a very easy manner.

In accordance with the patent statutes I have described the principles of operation of my steering gear and while I have illustrated a particular construction and arrangement of the parts, I desire to have it understood that the same is only suggestive of a means of carrying out my invention and that variations may be made within the scope of the following claims without departing from the spirit of my invention:

I claim:

1. A steering gear including, a steering shaft, gears connected to said shaft, complemental gears operated by said gears, a pair of operating pinions operated by said complemental gears, a countershaft, and differential gears carried by said counter-shaft having segmental gear surfaces whereby said pinions are adapted to engage said differential gears to operate said countershaft.

2. A steering gear for a motor vehicle including, a countershaft, a pair of gears carried by said countershaft having segmental working faces which extend toward each other, pinions adapted to engage said working faces, and gear means adapted to connect said pinions with a steering shaft.

3. A steering gear including a countershaft adapted to operate a steering lever arm for a motor vehicle, a pair of segmental gears mounted on said countershaft with their working faces extending toward each other and positioned diametrically opposite, operating pinions engageably positioned with said segmental gears, a steering shaft extending into said steering gear and having gear connections with said pinions whereby said steering shaft is adapted to operate said pinions to operate said steering arm on either side of the supporting shaft to balance and increase the applied power.

4. A steering gear for a motor vehicle including, a housing, a steering arm shaft adapted to extend into said housing, beveled segmental gears mounted on said shaft adjacent each other, pinions interposed between said shafts adapted to engage said gears diametrically opposite, and gear means connecting said pinions with the steering post in a manner to cause the steering post to operate the steering shaft by a balanced increased power to facilitate easy steering.

5. A steering gear including, a housing, a steering shaft adapted to extend into said housing, spaced apart gears fixed to said steering shaft, complemental gears meshing with said gears fixed to said shaft, pinions operated by said complemental gears, a steering countershaft and a pair of segmental gears in mesh with said pinions mounted in close proximity to each other on said steering countershaft adapted to facilitate easy operation of the steering mechanism of a motor vehicle through said steering gear.

6. A steering gear including, a steering post, a housing adapted to receive said post, a countershaft extending at right angles to said post adapted to operate the steering lever of the steering mechanism, adjacent segmental gears carried by said countershaft, pinions adapted to engage said segmental gears, and gear means connecting said pinions with said steering post in a manner to permit said steering post to operate said countershaft.

7. A steering gear for a motor vehicle including, a steering post, a countershaft, a casing adapted to receive said steering post and countershaft, segmental gears carried by said countershaft, pinions adapted to operate said segmental gears, and gears connecting said steering post with said pinions.

WILLIAM R. BREWER.